US011287948B2

(12) United States Patent
Huang et al.

(10) Patent No.: US 11,287,948 B2
(45) Date of Patent: Mar. 29, 2022

(54) METHOD FOR CONTROLLING THE EXECUTION OF A PROGRAM CONFIGURABLE INTO A DISABLED STATE AND ENABLED STATE

(71) Applicant: ORANGE, Paris (FR)

(72) Inventors: Menghuai Huang, Beijing (CN); Jie Wan, Beijing (CN); Nan Ye, Beijing (CN); Zhihong Guo, Beijing (CN); Xin-Lucienne Liu, Beijing (CN)

(73) Assignee: Orange, Paris (FR)

( * ) Notice: Subject to any disclaimer, the term of this patent is extended or adjusted under 35 U.S.C. 154(b) by 0 days.

(21) Appl. No.: 15/740,952

(22) PCT Filed: Jun. 28, 2016

(86) PCT No.: PCT/IB2016/001078
§ 371 (c)(1),
(2) Date: Dec. 29, 2017

(87) PCT Pub. No.: WO2017/001933
PCT Pub. Date: Jan. 5, 2017

(65) Prior Publication Data
US 2018/0189069 A1    Jul. 5, 2018

(30) Foreign Application Priority Data
Jun. 29, 2015   (WO) ................ PCT/CN2015/082705

(51) Int. Cl.
*G06F 9/44*    (2018.01)
*G06F 3/0481*    (2022.01)
(Continued)

(52) U.S. Cl.
CPC ........ *G06F 3/04817* (2013.01); *G06F 3/0482* (2013.01); *G06F 3/0486* (2013.01);
(Continued)

(58) Field of Classification Search
None
See application file for complete search history.

(56) References Cited

U.S. PATENT DOCUMENTS

| 6,425,120 | B1 * | 7/2002 | Morganelli | ............... | G06F 8/34 715/762 |
| 7,834,861 | B2 * | 11/2010 | Lee | ....................... | G06F 3/0482 345/173 |

(Continued)

FOREIGN PATENT DOCUMENTS

CN    104144102 A    11/2014

OTHER PUBLICATIONS

The International Search Report from International Application No. PCT/CN2015/082705.

*Primary Examiner* — Abu Zar Ghaffari
(74) *Attorney, Agent, or Firm* — Haverstock & Owens, A Law Corporation

(57) ABSTRACT

The invention deals a method for controlling the execution of a program by a terminal (1) comprising a screen (12), wherein the method comprises the steps of: configuring the program into an enabled state, wherein at least one process of the program is allowed to be executed by the terminal (1), and a disabled state, wherein execution of any process of the program by the terminal (1) is forbidden, wherein the method further comprises the steps of: displaying (100) on the screen (12) an icon (G) for starting the program according to a first rendering if the program is configured in the enabled state, and displaying (114) said icon (G) according to a second rendering different from the first rendering if the program is configured in the disabled state.

15 Claims, 6 Drawing Sheets

(51) Int. Cl.
  *G06F 3/04817* (2022.01)
  *G06F 9/451* (2018.01)
  *G06F 3/0482* (2013.01)
  *G06F 3/0486* (2013.01)
  *G06T 11/60* (2006.01)
(52) U.S. Cl.
  CPC ............... *G06F 9/44* (2013.01); *G06F 9/451* (2018.02); *G06T 11/60* (2013.01); *G06T 2200/24* (2013.01)

(56) References Cited

U.S. PATENT DOCUMENTS

| | | | | |
|---|---|---|---|---|
| 8,812,994 B2* | 8/2014 | Seymour | ............... | G06F 3/0487 715/863 |
| 9,563,347 B2* | 2/2017 | Yano | ................ | H04M 1/72469 |
| 9,578,155 B2* | 2/2017 | Kim | .................... | H04M 1/0202 |
| 9,898,171 B2* | 2/2018 | Ito | ........................ | H04N 1/4433 |
| 10,180,727 B2* | 1/2019 | Boblett | .................. | G06F 3/017 |
| 10,534,500 B1* | 1/2020 | Ledet | ................. | G06F 3/04842 |
| 2003/0059045 A1* | 3/2003 | Ruehle | .................... | G06F 7/582 380/46 |
| 2008/0034310 A1* | 2/2008 | Kodosky | ............ | G05B 19/0426 715/769 |
| 2009/0178007 A1* | 7/2009 | Matas | .................. | G06F 3/0482 715/835 |
| 2009/0228820 A1 | 9/2009 | Kim et al. | | |
| 2011/0004590 A1* | 1/2011 | Lilley | .................... | G06Q 10/06 707/723 |
| 2012/0178496 A1 | 7/2012 | Hwang et al. | | |
| 2012/0278745 A1* | 11/2012 | Kim | .................... | G06F 3/04817 715/769 |
| 2012/0299862 A1* | 11/2012 | Matsumoto | ........... | G06F 3/0488 345/173 |
| 2012/0311499 A1* | 12/2012 | Dellinger | ........... | H04N 5/23216 715/835 |
| 2013/0145313 A1* | 6/2013 | Roh | ....................... | G06F 3/0481 715/802 |
| 2013/0283275 A1* | 10/2013 | Kim | ........................ | G06F 9/445 718/100 |
| 2014/0053198 A1* | 2/2014 | Sirpal | ................ | H04N 21/8173 725/43 |
| 2014/0059480 A1* | 2/2014 | de Paz | .................... | G06F 3/017 715/781 |
| 2014/0118263 A1* | 5/2014 | Tajima | .................... | G06F 9/451 345/168 |
| 2014/0136979 A1* | 5/2014 | Morotomi | ......... | H04M 1/72522 715/716 |
| 2014/0325410 A1* | 10/2014 | Jung | .................... | G06F 3/0488 715/765 |
| 2015/0033122 A1* | 1/2015 | Park | ........................ | G06F 3/016 715/702 |
| 2015/0052464 A1* | 2/2015 | Chen | ................... | G06F 3/04817 715/765 |
| 2015/0074615 A1* | 3/2015 | Han | ........................ | H04L 63/083 715/863 |
| 2015/0095853 A1* | 4/2015 | Hoerentrup | ............. | G06F 3/048 715/841 |
| 2015/0170137 A1* | 6/2015 | Balbus | .................. | G06Q 20/32 705/41 |
| 2016/0054137 A1* | 2/2016 | Wheatman | ............. | G01C 21/36 701/425 |
| 2016/0119675 A1* | 4/2016 | Voth | .................. | H04N 21/4532 725/14 |
| 2016/0240165 A1* | 8/2016 | Suzuki | .................. | G06F 1/1694 |

* cited by examiner

METHOD FOR CONTROLLING THE EXECUTION OF A PROGRAM CONFIGURABLE INTO A DISABLED STATE AND ENABLED STATE

TECHNICAL FIELD

The invention deals with a method for controlling the execution of a program configurable into an enabled state and a disabled state.

STATE OF THE ART

Most applications installed in a terminal comprise different types of processes or services: foreground processes interacting with a user of the terminal through a graphical user interface, and background processes.

An application can typically started when a user of the terminal clicks on or taps on an icon of the application displayed on a screen of the terminal. This icon is commonly displayed in a specific menu showing icons of all applications installed in the terminal. This icon can also be displayed in a default menu displayed in the first place whenever the user turns on the screen of the terminal and commonly referred to as "home screen".

However, a background process may be secretly running even though the user is not currently using the application. A background process can be started whenever an operating system of the terminal is booted, or upon detecting some other device events. Such a background process can perform actions on the device by checking the device location, the app updates or news from the internet which secretly consumes the terminal resources such as CPU, memory, consequently the battery and so on.

To block out any activities issued from an installed application for a period of time, the user could choose to uninstall the whole application, and reinstall it whenever needed afterwards.

However, re-installing an application requires downloading it from a remote server.

Some existing operating systems allow the user to "disable" a pre-installed application. The operating system configures alternately the application into an enabled state, wherein at least one process of the program is allowed to be executed, and a disabled state, wherein execution of any process of the program is forbidden.

Disabling an application, i.e. configuring the application in its disabled state, is performed by clicking on a graphical button displayed in a dedicated settings menu of the operating system. After disabling, all icons of the application are removed from the home menu and from the application menu.

As a consequence, in order to launch a disabled application, the user has to find, and enable the application from the settings menu, then go back to the home screen to launch it. It is not a simple and intuitive way for a user who'd like to temporally disable and enable any application installed on the device quickly.

Besides, the user has to access the settings menu is order to clearly know if an application is enabled or disabled.

SUMMARY OF THE INVENTION

The invention aims at warning the user that an application is currently enabled or disabled in a simpler way than the prior art.

For this purpose, the invention proposes a method for controlling the execution of a program by a terminal comprising a screen, wherein the method comprises the steps of: configuring the program into an enabled state, wherein at least one process of the program is allowed to be executed by the terminal, and a disabled state, wherein execution of any process of the program by the terminal is forbidden, wherein the method further comprises the steps of: displaying on the screen an icon for starting the program according to a first rendering if the program is configured in the enabled state, and displaying said icon according to a second rendering different from the first rendering if the program is configured in the disabled state.

The process may further comprise the following features taken separately or combined whenever it is technically possible:

- rendering the icon using a first set of colors if the current state is the enabled state, and rendering the icon is rendered using a second set of colors if the current state is the disabled state, wherein the second set of colors is a subset of the first set;
- altering a default shape of the icon into a first altered shape if the current state is one of the disabled and enabled states, and altering a default shape of the icon into a second altered shape or leaving said default shape unchanged, if the current state is the other state;
- compositing the icon with a first indicator overlapping the icon, if the current state is one of the disabled and enabled states, and compositing the icon with a second indicator overlapping the icon, wherein the second indicator is different from the first indicator, or leaving the icon free of indicator, if the current state is the other of the two states:
- configuring the program into the enabled state whenever detecting that the program has been started using the icon;
- displaying a context menu whenever detecting that the icon was pressed on or tapped on, said menu showing a first item for directly starting the application and another item for changing the state of the program;
- detecting a user event indicating that the icon has been moved on the screen according to a first predetermined motion pattern, and changing the current state of the program in response to detecting the user event;
- using as a predetermined motion pattern a motion of the icon into a predetermined area of the screen;
- detecting that the icon has been dragged and dropped in the predetermined area as user event;
- displaying a target indicating the location of the predetermined area on the screen
- displaying the target whenever detecting that the icon has been pressed on during a predetermined duration, and erasing the target from the screen in response to detecting the user event;
- detecting a second user event ordering to stop the program after it has been started, and configuring the application into the disabled state in response to detecting the second user event;
- terminating, ending and/or killing any process of the program being executed whenever the program is configured into the disabled state;
- saving the state the program has been configured into a non-volatile memory of the terminal;
- configuring the program so that metadata of the program stored in a memory of the terminal is still accessible when said program is in the disabled state.

The invention also proposes a computer program product comprising code instructions for execution of the method for controlling the execution of a program by a terminal.

The invention also proposes a terminal comprising a screen, a memory storing a computer program, at least one processor for executing the program, said processor being configured to configure alternately the program into an enabled state, wherein at least one process of the program is allowed to be executed by the processor, and a disabled state, wherein execution of any process of the program by the processor is forbidden, wherein the terminal is characterized in that the processer is further configured to display on the screen an icon for starting the program according to a first rendering if the program is configured in the enabled state, and display said icon according to a second rendering different from the first rendering if the program is configured in the disabled state.

DESCRIPTION OF FIGURES

Further features, goals and advantages will be highlighted in the following description which is not limitative and must be read in relation with the following figures.

FIGS. 2 and 3 represent steps of a method for controlling execution of a computer program by a terminal according to an embodiment of the invention.

On all figures, similar elements have identical references.

DETAILED DESCRIPTION OF AN EMBODIMENT OF THE INVENTION

Figure 1:
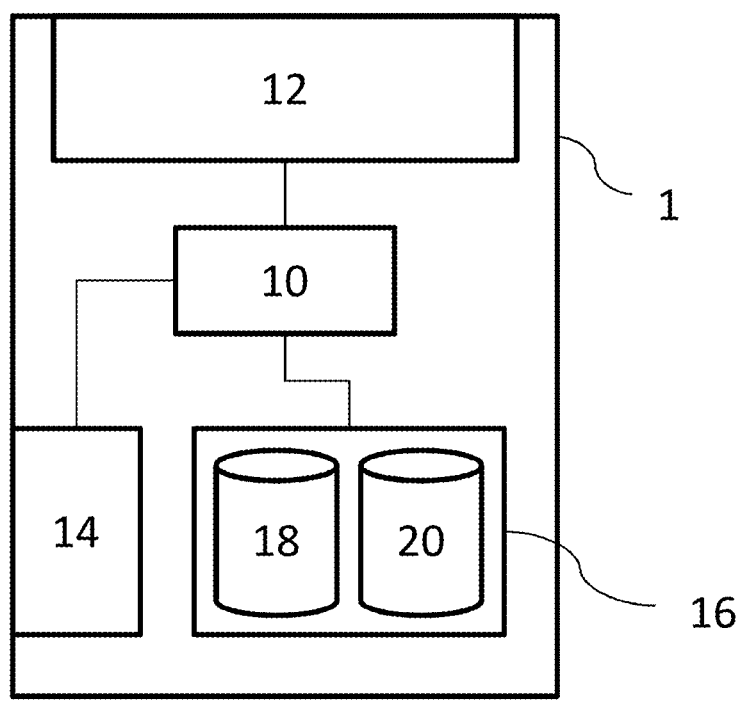
FIG. 1 represents schematically a terminal according to an embodiment of the invention.

Referring to FIG. 1, a terminal comprises at least one processor 10, a screen 12, a user input interface 14 and a memory 16.

The memory 16 comprises a volatile memory unit 18 (such as RAM) and a non-volatile memory unit 20 (such as flash memory, HDD memory, SSD memory of a combination thereof).

The user input interface 14 typically is configured to capture user events: it may comprise a keyboard, a touchscreen 12, a mouse, or a combination thereof.

An operating system is stored in the non-volatile memory unit 20, as well as at least one computer program referred to as an "application" in the following.

The processor 10 is configured to execute the operating system and the application.

The operating system is configured to control the execution of the application by the processor 10.

The operating system comprises instructions for displaying a graphical user interface (GUI) on the screen 12 of the terminal 1. This GUI typically comprises a "home screen" menu, an application menu and a settings menu known of the prior art and discussed in the introduction.

The application is associated with graphical data for displaying on the screen 12 an icon G (illustrated on FIGS. 4a-4d and 6a-6c) for starting the application.

The operating system is further configured to start the application once a particular user event involving the icon G is detected. This user event will be described later on.

The application comprises at least one foreground process comprising code instructions for displaying a GUI specific to this application and for communicating with the user input interface 14 through the operating system.

The application further comprises at least one background process. As indicated before, the background process may be executed by the processer secretly, even though the user has closed the application.

The application may be configured by the operating system into two different states:
  an enabled state, wherein at least one process of the program is allowed to be executed by the operating system, and
  a disabled state, wherein execution of any process of the program by the operating system is forbidden.

More particularly, the background process shall not be executed by the terminal 1 if the application is disabled.

In practice, a flag may identify the current state of an application: in the disabled state, the flag is set to a first value (say 0) and in the enabled state the flag is set to a second value different from the first value (say 1).

This flag can be saved in the non-volatile memory unit and updated whenever the state changes.

The operating system may secretly start any background process of an enabled application, i.e. without the user's explicit demand.

An enabled application may be automatically started when the operation system boots up. For instance, Windows operating system starts automatically an application at boot if said application is linked to a "startup" folder, has a service registered in the OS, or is in somewhere in the Windows Registry. Android operating system also offers such a feature by automatically invoking an enabled application once the device boot is completed.

The operating system can also start and/or run a process of an enabled program secretly whenever the user unlocks the terminal, i.e. after successful authentication of the user (using a PIN code, a gesture drawn on screen, etc.).

On the contrary, the operation system refrains from starting and running any process of a disabled application, including background processes.

In an embodiment, the operating system is authorized to access (read) metadata stored in the memory 16 (typically the non-volatile memory 20) that is specifically associated with a disabled program.

This metadata may include assets such as image data (especially icons), audio data, video data and/or text data (such as the program's manifest file).

Disabling an Enabled Application

The application is first supposed to be enabled, i.e. its state is supposed to be set to the value "enabled".

Figure 2:
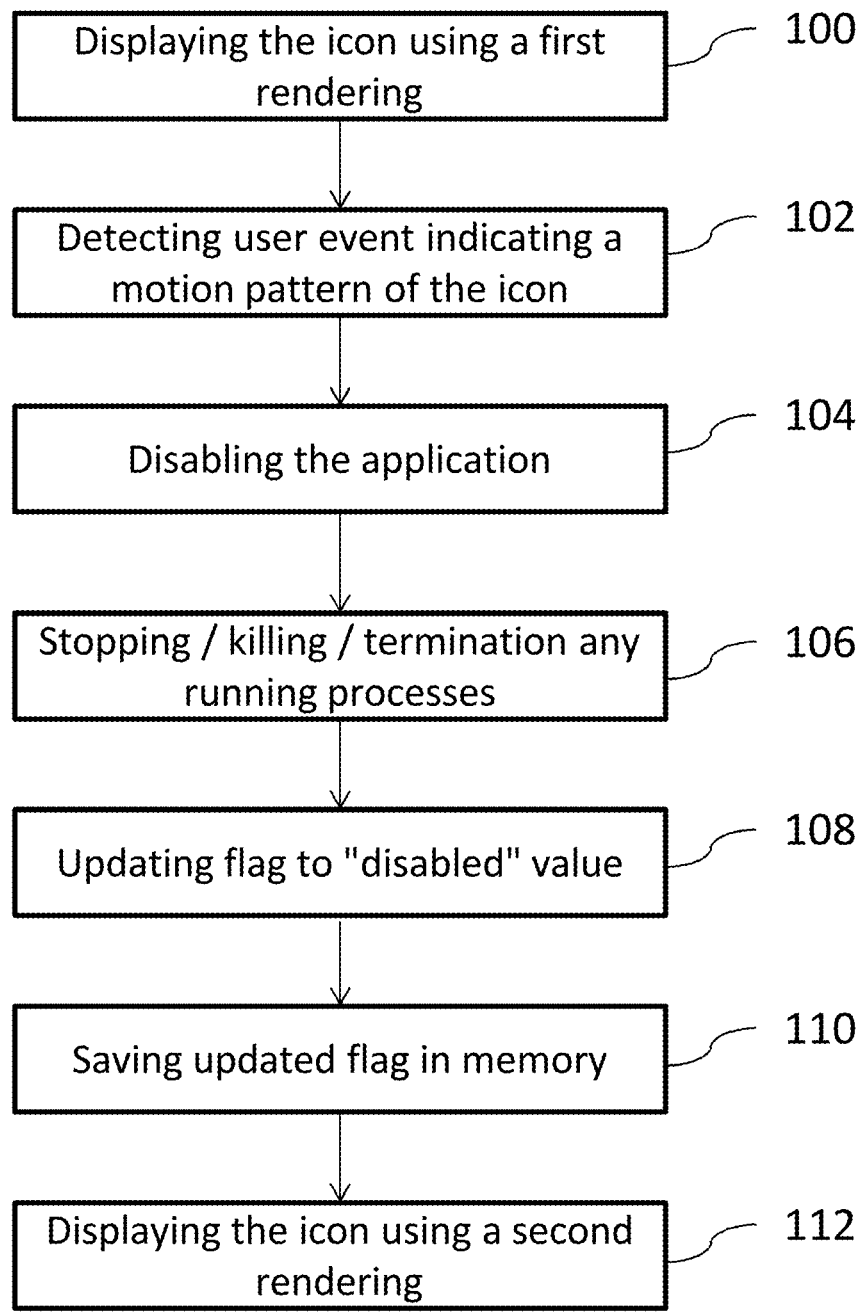
FIG. 2 represents steps of a method for controlling execution of a computer program by a terminal, according to an embodiment of the invention.
Figure 4A:
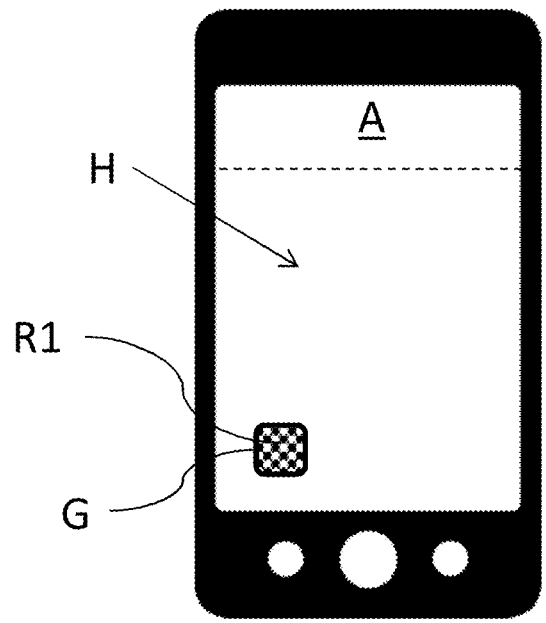
FIGS. 4a to 4d represent different states of a terminal while the steps of FIG. 3 are carried out.
Figure 4B:
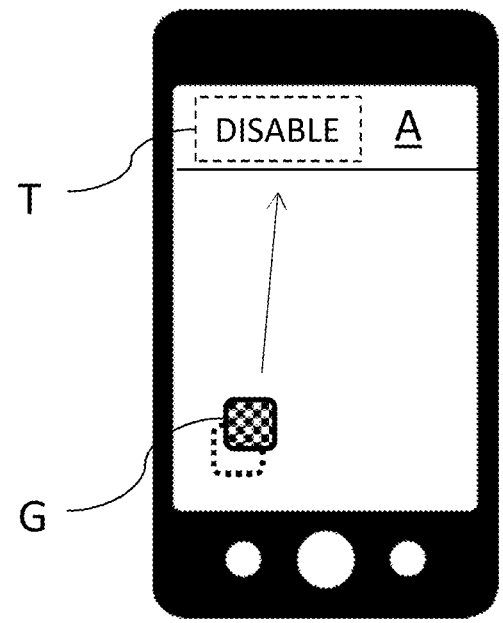

Referring to FIG. 2, the operating system displays the icon G of the application on the screen 12 according to a first rendering R1 in a step 100 (see FIG. 4a).

This first rendering R1 is for instance a default rendering of the graphical data using a predetermined set of colors.

This first rendering R1 can also comprise a first shape alteration of the default shape of the icon.

This first rendering R1 can comprise a first composition of the icon with a first indicator overlapping the icon.

This step 100 occurs when the user accesses a menu containing the icon G, such as the applications menu or the home screen H.

In a step 102, the operating system detects a predetermined user event indicating that the icon G has been moved on the screen 12 according to a first predetermined motion pattern.

Figure 3:
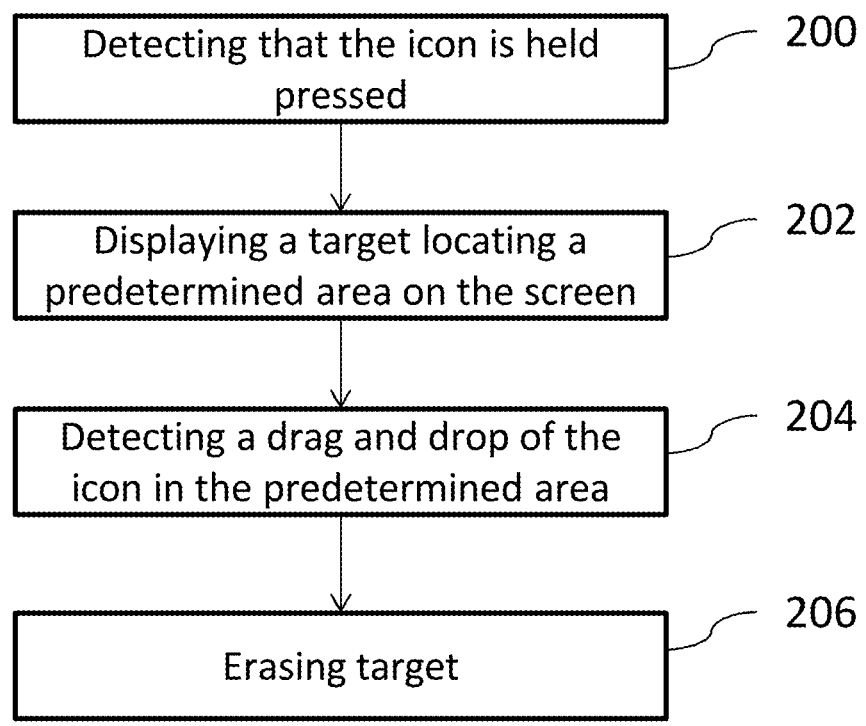

In an embodiment the detection step 102 comprises the sub-steps illustrated on FIG. 3 and the terminal 1 behaves as illustrated on FIGS. 4a-4d.

In this embodiment, the motion pattern is a motion of the icon G into a predetermined area A of the screen 12, for example a rectangular top part of the screen 12 of predetermined size.

In a sub-step 200, the operating system detects that the user presses on the icon G for a predetermined duration.

In response to said detection 200, the operating system displays 202 a target T indicating the location of the predetermined area A (see FIG. 4a).

Besides, the operation system checks the current state of the application and displays as target T a piece of text corresponding to the action of switching the state of the application from the current state into the other state. For instance, the word "disable" is displayed in the target T (see FIG. 4b).

Whenever the operation system detects that 204 the icon G has been dragged then dropped in the predetermined area A of the screen 12, disabling 104 or enabling 118 the application is triggered.

Figure 4C:
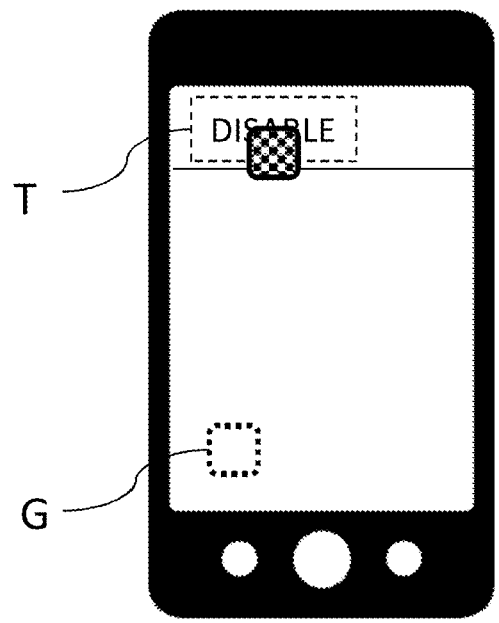
Figure 4D:
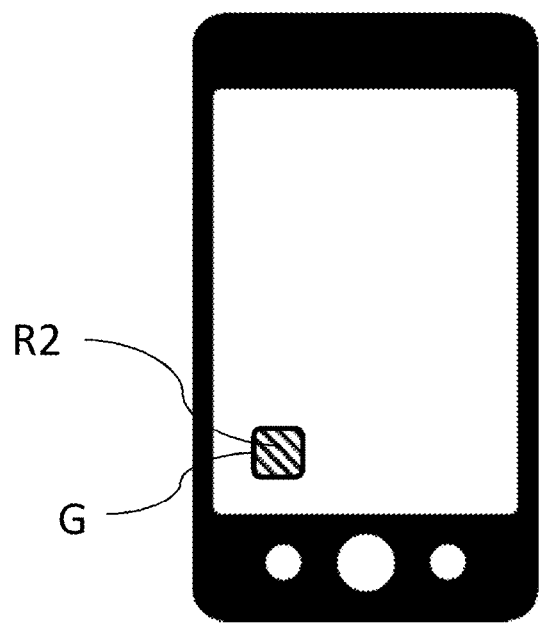

The target T is erased from the screen 12 when the user "drops" the icon G, i.e. when the operating system detects that the user stops pressing the icon G after dragging it (see FIGS. 4c and 4d). Now turning back to FIG. 2, the operating system reconfigures 104 the applications in the "disabled" state in response to detecting 102 the user event. This reconfiguration makes sure that the operation system refrains from starting and running any background process of the application.

The operating system further checks if any process of the application is currently run by the processor 10. If yes, the operating systems terminates, ends and/or kills any running process of the application in a step 106. The space allocated in the volatile memory by these running processes is also freed.

Besides, the flag associated with the application is set 108 to the "disabled" value and saved 110 in the non-volatile memory of the terminal 1. As a consequence, the application will still be disabled even if the terminal 1 is turned off then turned on again and/or if the operation system reboots for some reason.

In a step 112, the operating system displays the icon G of the application according to a second rendering R2 different from the first rendering R1 (see FIG. 4d).

For instance, the second rendering R2 uses a limited set of colors, which is a subset of the set of colors used for the first rendering R1. In an embodiment, the icon G is displayed according to the second rendering in monochrome or in grayscale.

The second rendering R2 can also be a second shape alteration of the icon wherein the second shape alteration is different from the first shape alteration of rendering R1.

It should be understood that one of the two renderings R1 et R2 may not perform any alteration of the icon while the other rendering does.

Alternatively, this first rendering R1 can be a composition of the icon with a second indicator overlapping the icon that is different from the first indicator using in rendering R1.

Reconfiguration 104, termination 106, update 108 and displaying step 112 may be carried out in any order after detecting 102 the user event indicating that the icon G was moved according to the predetermined motion pattern.

Enabling a Disabled Application

Figure 5:
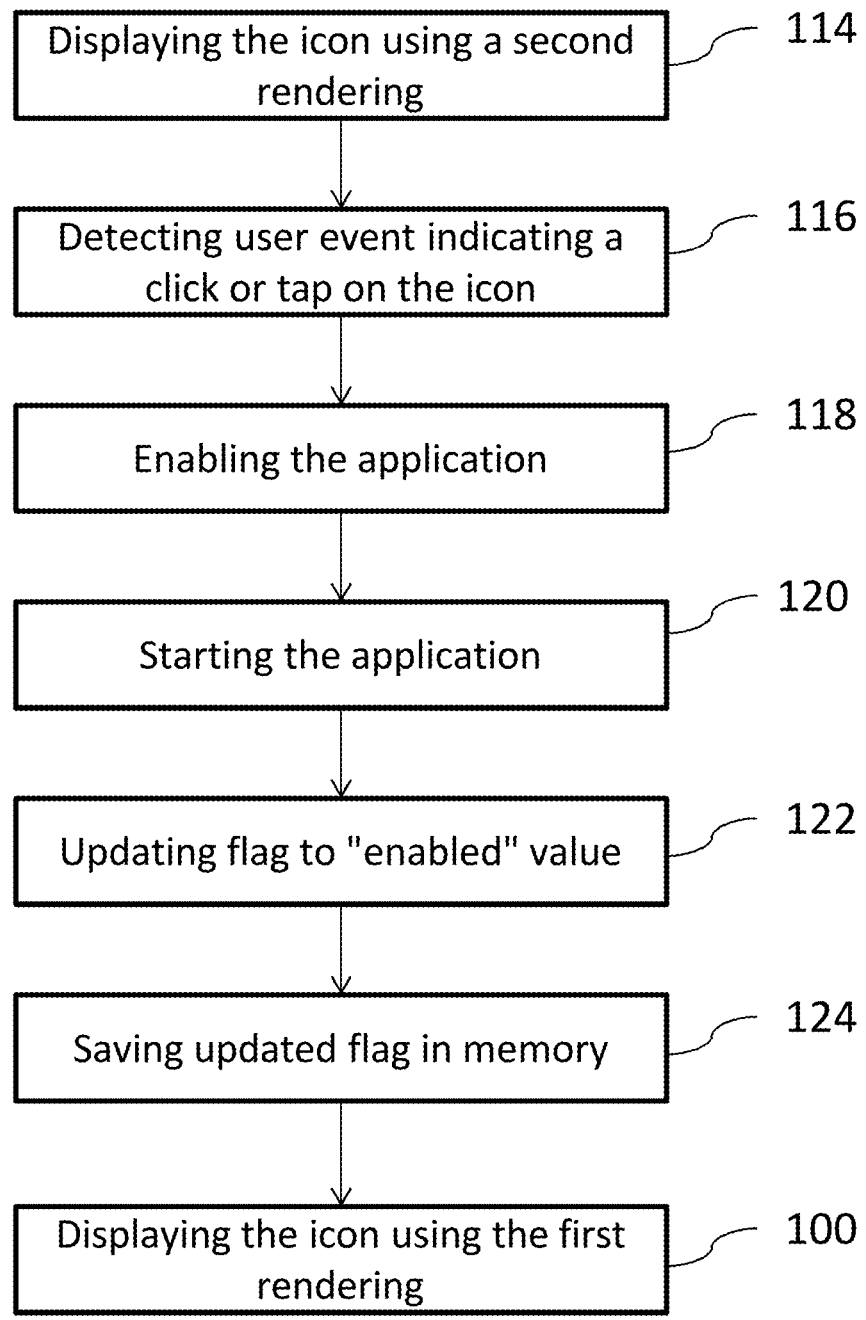
FIG. 5 represent other steps of a method for controlling execution of a computer program by a terminal according to an embodiment of the invention.

Referring to FIG. 5, the application is switched from the "disabled" state to the "enabled" state according to the following steps.

Figure 6A:
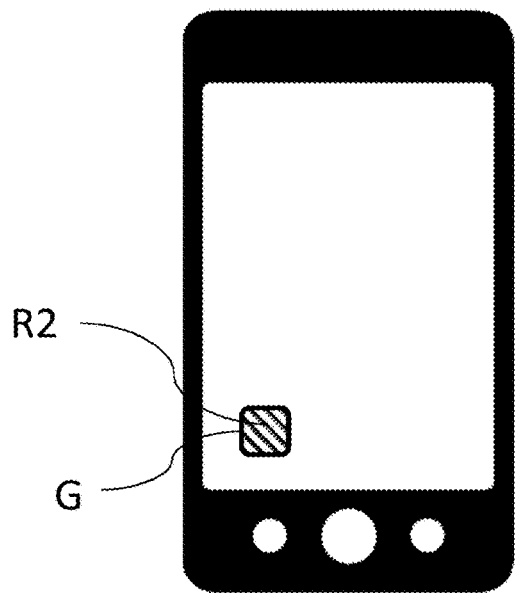
FIGS. 6a to 6c represent different states of a terminal while the steps of FIG. 5 are carried out.

We suppose that the icon G is displayed 114 according to the second rendering R2 (see FIG. 6a).

In step 116, the operation system detects that the user clicked on or tapped on the icon G of the disabled application.

In response to this detection 116, the operation also reconfigures 118 the application into the "enabled" state. Once the configuration 118 is complete, background processes are allowed to be run by the processor 10.

Besides, the operating system automatically starts 120 the application.

This automatic startup of the application is advantageous in that the user needs not access any settings menu in order to re-enable the application before starting it. In other words, enabling and launching an application are merged into one single user action.

Figure 6B:
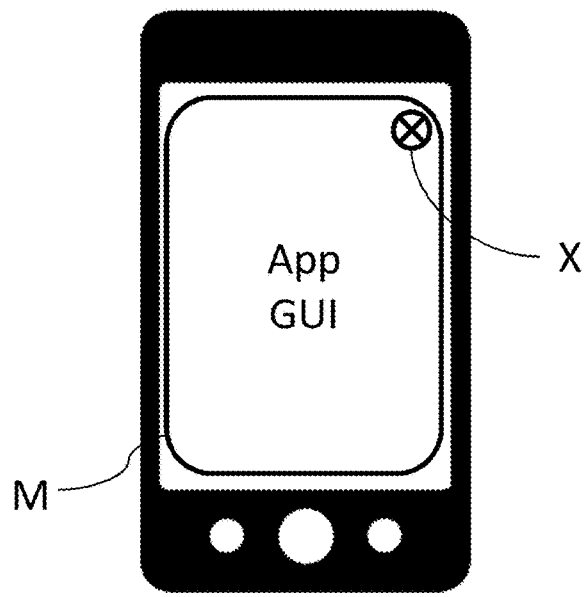
Figure 6C:
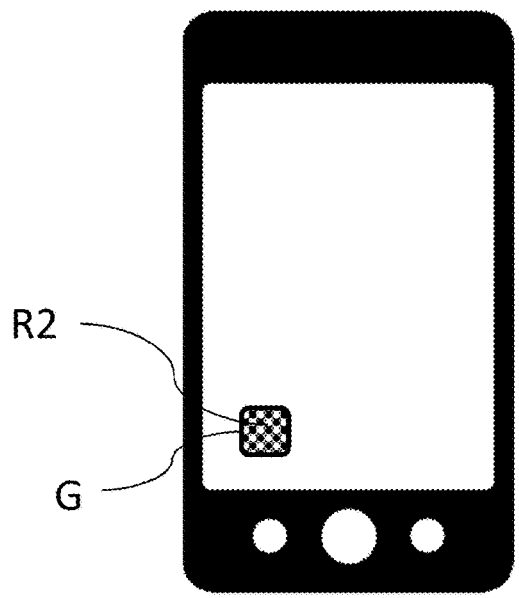

At startup, a foreground process of the application is executed by the processor 10, which displays the GUI M of the application on the screen 12 (see FIG. 6b).

Besides, the flag associated with the application is set 122 to the "enabled" value and saved 122 in the non-volatile memory of the terminal 1. As a consequence, the application will still be enabled even if the terminal 1 is turned off then turned on again and/or if the operation system reboots for some reason.

Besides, the operating system displays the icon G of the application on the screen 12 according to a first rendering R1 in the step 100 (see FIG. 6c) in response to this detection 116.

This change may not be immediately visible on the screen 12 if the GUI M of the application actually covers the icon G. But this change will be visible on the screen once the user exits the application, for instance by clicking on the cross X illustrated on FIG. 6b.

In another embodiment, the application is not directly started whenever the user clicks on or taps on the icon G. The operation system rather displays a context menu whenever detecting that the icon G was pressed on or tapped on.

The context menu shows a first graphical item for directly starting the application, and a second graphical item for changing the state of the program.

If the operating system detects that the user clicks on or taps on the second item, the operation system reconfigures the application into the "enabled" state but the application is not directly started. From this point on, the operation system is allowed to start a background process of the application secretly.

If the operating system detects that the user clicks on or taps on the first item, the operation system starts the application and temporarily allows processes of said application to be run until the user exits the application.

If the operating system detects that the user clicks or taps outside the context menu, which does not displayed full screen 12, the operating systems closes the context menu.

The operating system may also enable a disabled application whenever that the icon G has been moved on the screen 12 according to a second predetermined motion pattern.

This second motion pattern may be identical to the first motion pattern; in this case, all steps 200, 202, 204, 206 can be performed as well for enabling an application (but text "enable" is displayed in target T instead of text "disable").

The method described upwards for controlling the execution of an application in the terminal 1 can be performed for each application installed in the terminal 1. Each application has its own state, its own icon, and can therefore be enabled and disabled independently of the other applications.

In an embodiment, a set of applications may be disabled or enabled by performing the drag-and-drop procedure of FIG. 3 on a folder containing icons of each application in said set of applications, rather than on a single icon G.

Another context in which the icon G of a program may be displayed is whenever a user of the terminal 1 is invited to select a program among a predetermined set of programs in response to a particular action.

Such an action is for example clicking on a "share" button printed on a web page or on the GUI of another program that is being displayed on the screen of the terminal 1. The predetermined set of programs comprises in this case all programs installed in the terminal 1 and implementing a function of sharing content over a network such as the Internet (mailing applications, social network clients and so on).

In response to clicking on the "share" button, the operating system displays on the screen all icons of said predetermined programs as a list.

Each icon is rendered using rendering R1 or R2, depending on the current state of each program.

Whenever the user clicks on or taps on an icon that is displayed according to rendering R2 (meaning that the corresponding application is in the "disabled" state), all steps 116, 118, 120 are performed.

A disabled application may also be enabled using other triggers that detection 116 involving the icon G, for instance whenever detecting that the user did a predetermined gesture on the touchscreen (i.e. drew a particular pattern), said predetermined gesture being associated with the program.

Besides, it should be understood that all steps described above that involve the icon G of the program may be performed for all short-cut icons of said program scattered in different menus of the operating system (or the same menu).

More particularly, disabling or enabling a program triggers a change of rendering R1 or R2 of all icons of said program used by the user as short-cuts.

The invention claimed is:

1. Method for controlling the execution of a program by a terminal comprising a screen, wherein the program is configurable into
   an enabled state wherein at least one process of the program is allowed to be executed by the terminal, and
   a disabled state wherein no process of the program is allowed to be executed by the terminal,
wherein the method comprises:
   displaying on the screen an icon for starting the program according to a first rendering in a home menu of the terminal when the program is configured in the enabled state;
   displaying said icon according to a second rendering different from the first rendering in the home menu of the terminal when the program is configured in the disabled state; and
   configuring the program from the disabled state into the enabled state and then starting the program whenever detecting that the icon is pressed on or tapped; and
   detecting a user event indicating that the icon has been moved on the screen according to a predetermined motion pattern, and changing the current state of the program in response to detecting the user event, wherein the predetermined motion pattern is a motion of the icon into a predetermined area of the screen.

2. Method as claimed in claim 1, comprising:
   rendering the icon using a first set of colors when the program is in the enabled state,
   rendering the icon is rendered using a second set of colors when the program is in the disabled state, wherein the second set of colors is a subset of the first set of colors.

3. Method as claimed in claim 1, comprising:
   altering a default shape of the icon into a first altered shape when the program is in one of the disabled and enabled states,
   altering the default shape of the icon into a second altered shape or leaving said default shape unchanged, when the program is in another of the disabled and enabled states.

4. Method as claimed in claim 1, comprising:
   compositing the icon with a first indicator overlapping the icon, when the program is in one of the disabled and enabled states,
   compositing the icon with a second indicator overlapping the icon, wherein the second indicator is different from the first indicator, or leaving the icon free of indicator, when the program is in another of the two states.

5. Method as claimed in claim 1, wherein the user event indicates that the icon has been dragged and dropped in the predetermined area.

6. Method as claimed in claim 5, further comprising displaying a target indicating the location of the predetermined area on the screen.

7. Method as claimed in claim 1, further comprising displaying a target indicating the location of the predetermined area on the screen.

8. Method as claimed in claim 7, further comprising:
   displaying the target whenever detecting that the icon has been pressed on during a predetermined duration,
   erasing the target from the screen, when the user event is detected.

9. Method as claimed in claim 1, further comprising terminating, ending and/or killing any process of the program being executed whenever the program is configured into the disabled state.

10. Method as claimed in claim 1, further comprising saving a state of the program has been configured into a non-volatile memory of the terminal.

11. Method as claimed in claim 1, wherein metadata of the program that is stored in a memory of the terminal is accessible when said program is in the disabled state.

12. A memory configured for storing a computer program product comprising code instructions for execution of a method for controlling execution of a program by a terminal comprising a screen, when this program product is executed by at least one processor, wherein the computer program product is configurable into:
   an enabled state wherein at least one process of the program is allowed to be executed by the terminal, and
   a disabled state wherein no process of the program is allowed to be executed by the terminal,
wherein the method comprises:
   displaying on the screen an icon for starting the program in a home menu of the terminal according to a first rendering when the program is configured in the enabled state, wherein the program is started whenever detecting that the icon is pressed on or tapped;

displaying said icon in the home menu of the terminal according to a second rendering different from the first rendering when the program is configured in the disabled state; and performing at least one of the following steps:
configuring the program from the disabled state into the enabled state and then starting the program whenever detecting that the icon is pressed on or tapped, displaying a context menu whenever detecting that the icon was pressed on or tapped on, said menu showing a first item for directly starting the program and another item for changing the state of the program, detecting a user event indicating that the icon has been moved on the screen according to a predetermined motion pattern, and changing the current state of the program in response to detecting the user event, detecting a second user event ordering to stop the program after it has been started while the program is in the enabled state, and configuring the program from the enabled state into the disabled state in response to detecting the second user event.

13. Terminal comprising:
a screen;
at least one processor for executing a program configurable into
an enabled state wherein at least one process of the program is allowed to be executed by the processor, and
a disabled state wherein no process of the program is allowed to be executed by the processor,
wherein the processor is configured to:
display on the screen an icon for starting the program in a home menu of the terminal according to a first rendering if the program is configured in the enabled state, wherein the program is started whenever detecting that the icon is pressed on or tapped,
display said icon in the home menu of the terminal according to a second rendering different from the first rendering if the program is configured in the disabled state, and
perform at least one of the following steps:
configuring the program from the disabled state into the enabled state and then starting the program whenever detecting that the icon is pressed on or tapped,
displaying a context menu whenever detecting that the icon was pressed on or tapped on, said menu showing a first item for directly starting the program and another item for changing the state of the program, detecting a user event indicating that the icon has been moved on the screen according to a predetermined motion pattern, and changing the current state of the program in response to detecting the user event, detecting a second user event ordering to stop the program after it has been started while the program is in the enabled state, and configuring the program from the enabled state into the disabled state in response to detecting the second user event.

14. Method for controlling the execution of a program by a terminal comprising a screen, wherein the program is configurable into
an enabled state wherein at least one process of the program is allowed to be executed by the terminal, and
a disabled state wherein no process of the program is allowed to be executed by the terminal,
wherein the method comprises:
displaying on the screen an icon for starting the program according to a first rendering when the program is configured in the enabled state;
displaying said icon according to a second rendering different from the first rendering when the program is configured in the disabled state; and
displaying a context menu whenever detecting that the icon was pressed on or tapped on, said menu showing a first item for directly starting the program and another item for changing the state of the program.

15. Method for controlling the execution of a program by a terminal comprising a screen, wherein the program is configurable into
an enabled state wherein at least one process of the program is allowed to be executed by the terminal, and
a disabled state wherein no process of the program is allowed to be executed by the terminal,
wherein the method comprises:
displaying on the screen an icon for starting the program in a home menu of the terminal according to a first rendering when the program is configured in the enabled state, wherein the program is started whenever detecting that the icon is pressed on or tapped;
displaying said icon in the home menu of the terminal according to a second rendering different from the first rendering when the program is configured in the disabled state; and
detecting a user event indicating that the icon has been moved on the screen according to a predetermined motion pattern, and changing the current state of the program in response to detecting the user event.

\* \* \* \* \*